United States Patent
Hyde

(10) Patent No.: US 8,260,241 B1
(45) Date of Patent: Sep. 4, 2012

(54) RFID READER WITH SUB-ORTHOGONAL SELF-JAMMER CANCELLATION

(75) Inventor: John D. Hyde, Corvallis, OR (US)

(73) Assignee: Impinj, Inc., Seattle, WI (US)

( * ) Notice: Subject to any disclaimer, the term of this patent is extended or adjusted under 35 U.S.C. 154(b) by 134 days.

(21) Appl. No.: 12/914,916

(22) Filed: Oct. 28, 2010

Related U.S. Application Data

(60) Provisional application No. 61/257,774, filed on Nov. 3, 2009.

(51) Int. Cl.
  *H04B 1/10* (2006.01)
  *H04B 7/00* (2006.01)
(52) U.S. Cl. .................. 455/296; 455/41.2
(58) Field of Classification Search .......... 455/41.1, 455/41.2, 63.1, 114.2, 296; 340/10.1, 10.52
  See application file for complete search history.

(56) References Cited

U.S. PATENT DOCUMENTS

| | | | |
|---|---|---|---|
| 2008/0081551 A1* | 4/2008 | Posamentier | 455/1 |
| 2009/0036082 A1* | 2/2009 | Sajid et al. | 455/296 |
| 2010/0069011 A1* | 3/2010 | Carrick et al. | 455/63.1 |

* cited by examiner

*Primary Examiner* — Nguyen Vo
(74) *Attorney, Agent, or Firm* — Turk IP Law, LLC

(57) ABSTRACT

RFID readers configured to transmit a radio frequency signal include a sub-orthogonal self-jammer cancellation circuit that generates two or more distinct phase variants of the transmit signal, selects two of the phase variants with a vector projection of one of the selected phase variants on another of the selected phase variants being substantially greater than zero such that a canceling signal comprising a combination of the at least two phase variants is substantially opposite in phase to a self-jamming signal, and selects amplitudes for the at least two selected phase variants such that the canceling signal is substantially equal in amplitude to the self-jamming signal. The canceling signal is then combined with the self-jamming signal to reduce the amplitude of an RF signal received by a receive circuit.

21 Claims, 12 Drawing Sheets

*ORTHOGONAL SELF-JAMMER CANCELLATION VECTORS*

*EXAMPLE SUB-ORTHOGONAL SELF-JAMMER CANCELLATION VECTORS*

EXAMPLE SELECTED PHASE VARIANT
VECTORS ANGLES AND AMPLIDUDES

RFID READER WITH SUB-ORTHOGONAL SELF-JAMMER CANCELLATION

CROSS REFERENCE TO RELATED APPLICATIONS

This application claims the benefit of U.S. Provisional Patent Application Ser. No. 61/257,774 filed on Nov. 3, 2009. The disclosures of the provisional patent application are hereby incorporated by reference for all purposes.

BACKGROUND

Radio Frequency Identification (RFID) systems typically include RFID tags and RFID readers. RFID readers are also known as RFID reader/writers or RFID interrogators. RFID systems can be used in many ways for locating and identifying objects to which the tags are attached. RFID systems are particularly useful in product-related and service-related industries for tracking objects being processed, inventoried, or handled. In such cases, an RFID tag is usually attached to an individual item, or to its package.

In principle, RFID techniques entail using an RFID reader to interrogate one or more RFID tags. The reader transmitting a Radio Frequency (RF) wave performs the interrogation. The RF wave is typically electromagnetic, at least in the far field. The RF wave can also be predominantly electric or magnetic in the near field.

A tag that senses the interrogating RF wave responds by transmitting back another RF wave. The tag generates the transmitted back RF wave either originally, or by reflecting back a portion of the interrogating RF wave in a process known as backscatter. Backscatter may take place in a number of ways.

The reflected-back RF wave may further encode data stored internally in the tag, such as a number. The response is demodulated and decoded by the reader, which thereby identifies, counts, or otherwise interacts with the associated item. The decoded data can denote a serial number, a price, a date, a destination, other attribute(s), any combination of attributes, and so on.

An RFID tag typically includes an antenna subsystem and a radio subsystem including a modem, a power management section, a logical section, and a memory. In some RFID tags the power management section includes an energy storage device such as a battery. RFID tags with an energy storage device are known as active or battery-assisted tags. Advances in semiconductor technology have miniaturized the electronics so much that an RFID tag can be powered solely by the RF signal it receives. Such RFID tags do not include an energy storage device such as a battery, and are called passive tags. Regardless of the type, all tags typically store or buffer some energy temporarily in passive storage devices such as capacitors.

In RFID readers, a portion of the RF signal transmitted by the transmit circuitry of the reader may couple into a receive path of the same reader as a "self-jammer" signal due to antenna reflection. Because the RF signals transmitted by the RFID tags (in response to the RF signal transmitted by the reader) are relatively weak signals, the self-jammer signal may interfere with the RF signals received from the tags causing degradation of quality or unintended operations at the reader. One approach to mitigating the self-jammer signal is attenuating a received signal at the RFID reader's front end through resistive or similar components, but that would also attenuate the already weak RFID tag signals, and is therefore an undesirable solution. Another approach is to attenuate the self-jammer signal by substantially cancelling it with a replica signal that is equal in amplitude but opposite in phase to the self-jammer signal. Such readers may generate the cancellation replica signal by combining appropriate amplitudes of two orthogonal signals that are separated in phase by 90 degrees.

BRIEF SUMMARY

This summary introduces a selection of concepts in a simplified form that are further described below in the Detailed Description. This summary is not intended to identify key features or essential features of the claimed subject matter, nor is it intended as an aid in determining the scope of the claimed subject matter.

Embodiments are directed to a sub-orthogonal self-jammer cancellation circuit adapted to receive a self-jamming signal associated with the transmit signal and generate at least two distinct phase variants of the transmit signal. The sub-orthogonal self-jammer circuit may select two of the distinct phase variants, where a vector projection of a first of the selected phase variants on a second of the selected phase variants is substantially greater than zero, and a canceling signal comprising a combination of the selected phase variants is substantially opposite in phase to the self-jamming signal. According to some embodiments, the sub-orthogonal self-jammer circuit may also select amplitudes for each of the two phase variants such that the canceling signal is substantially equal in amplitude to the self-jamming signal and combine the canceling signal with the self-jamming signal to reduce the amplitude of the RF signal received by the receive circuit.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The following Detailed Description proceeds with reference to the accompanying drawings, in which.

DETAILED DESCRIPTION

In the following detailed description, references are made to the accompanying drawings that form a part hereof, and in which are shown by way of illustration specific embodiments or examples. These embodiments or examples may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

Figure 1:
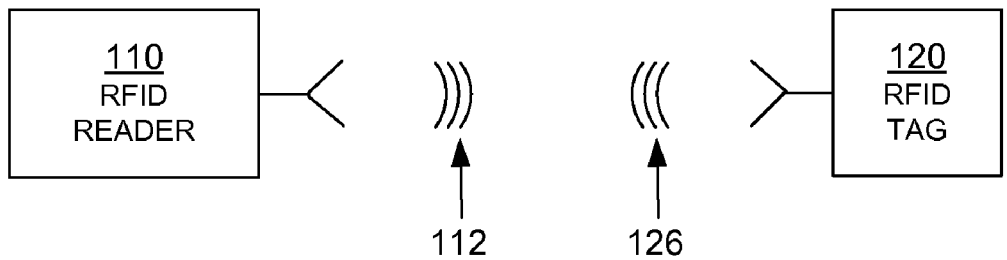
FIG. 1 is a block diagram of components of an RFID system.

FIG. 1 is a diagram of components of a typical RFID system 100, incorporating embodiments. An RFID reader 110 transmits an interrogating Radio Frequency (RF) wave 112. RFID tag 120 in the vicinity of RFID reader 110 may sense interrogating RF wave 112 and generate wave 126 in response. RFID reader 110 senses and interprets wave 126.

Reader 110 and tag 120 exchange data via wave 112 and wave 126. In a session of such an exchange each encodes, modulates, and transmits data to the other, and each receives, demodulates, and decodes data from the other. The data can be modulated onto, and demodulated from, RF waveforms. The RF waveforms are typically in a suitable range of frequencies, such as those near 900 MHz, 2.4 GHz, and so on.

Encoding the data can be performed in a number of ways. For example, protocols are devised to communicate in terms of symbols, also called RFID symbols. A symbol for communicating can be a delimiter, a calibration symbol, and so on. Further symbols can be implemented for ultimately exchanging binary data, such as "0" and "1", if that is desired. In turn, when the symbols are processed internally by reader 110 and tag 120, they can be equivalently considered and treated as numbers having corresponding values, and so on.

Tag 120 can be a passive tag, or an active or battery-assisted tag (i.e., having its own power source). Where tag 120 is a passive tag, it is powered from wave 112.

Figure 2:
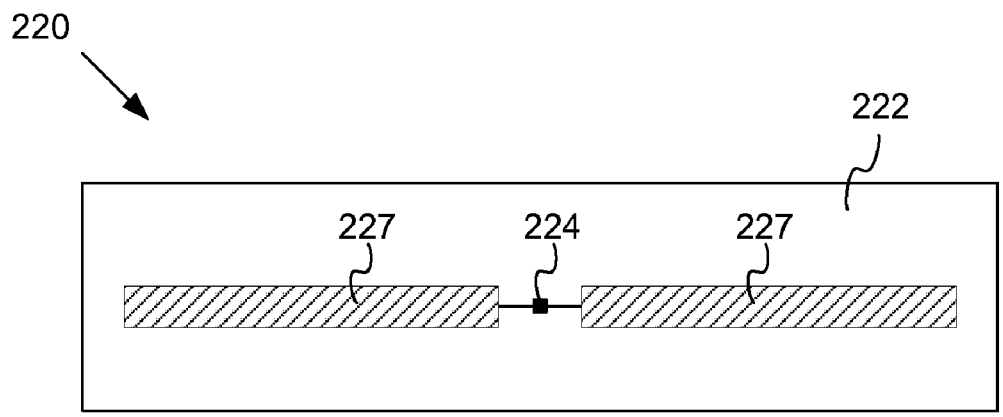
FIG. 2 is a diagram showing components of a passive RFID tag, such as a tag that can be used in the system of FIG. 1.

FIG. 2 is a diagram of an RFID tag 220, which can be the same as tag 120 of FIG. 1. Tag 220 is implemented as a passive tag, meaning it does not have its own power source. Much of what is described in this document, however, applies also to active and battery-assisted tags.

Tag 220 is typically formed on a substantially planar inlay 222, which can be made in many ways known in the art. Tag 220 includes an electrical circuit which is preferably implemented as an IC 224. IC 224 is arranged on inlay 222.

Tag 220 also includes an antenna for exchanging wireless signals with its environment. The antenna is often flat and attached to inlay 222. IC 224 is electrically coupled to the antenna via suitable antenna terminals (not shown in FIG. 2).

The antenna may be made in a number of ways. In the example of FIG. 2, the antenna is made from two distinct antenna segments 227, which are shown here forming a dipole. Many other embodiments are possible, using any number of antenna segments. In some embodiments, an antenna can be made with even a single segment. Different points of the segment can be coupled to one or more of the antenna terminals of IC 224. For example, the antenna can form a single loop, with its ends coupled to the terminals. It should be remembered that even a single segment could behave like multiple segments at the frequencies of RFID wireless communication.

In operation, a signal is received by the antenna and communicated to IC 224. IC 224 both harvests power, and responds if appropriate, based on the incoming signal and the IC's internal state. In order to respond by replying, IC 224 modulates the reflectance of the antenna, which generates backscatter 126 from wave 112 transmitted by the reader. Coupling together and uncoupling the antenna terminals of IC 224 can modulate the antenna's reflectance, as can a variety of other means.

In the embodiment of FIG. 2, antenna segments 227 are separate from IC 224. In other embodiments, antenna segments may alternatively be formed on IC 224, and so on. Furthermore, an interface element may be used to couple the IC 224 to the antenna segments 227 (not shown in FIG. 2).

The components of the RFID system of FIG. 1 may communicate with each other in any number of modes. One such mode is called full duplex. Another such mode is called half-duplex, and is described below.

Figure 3:
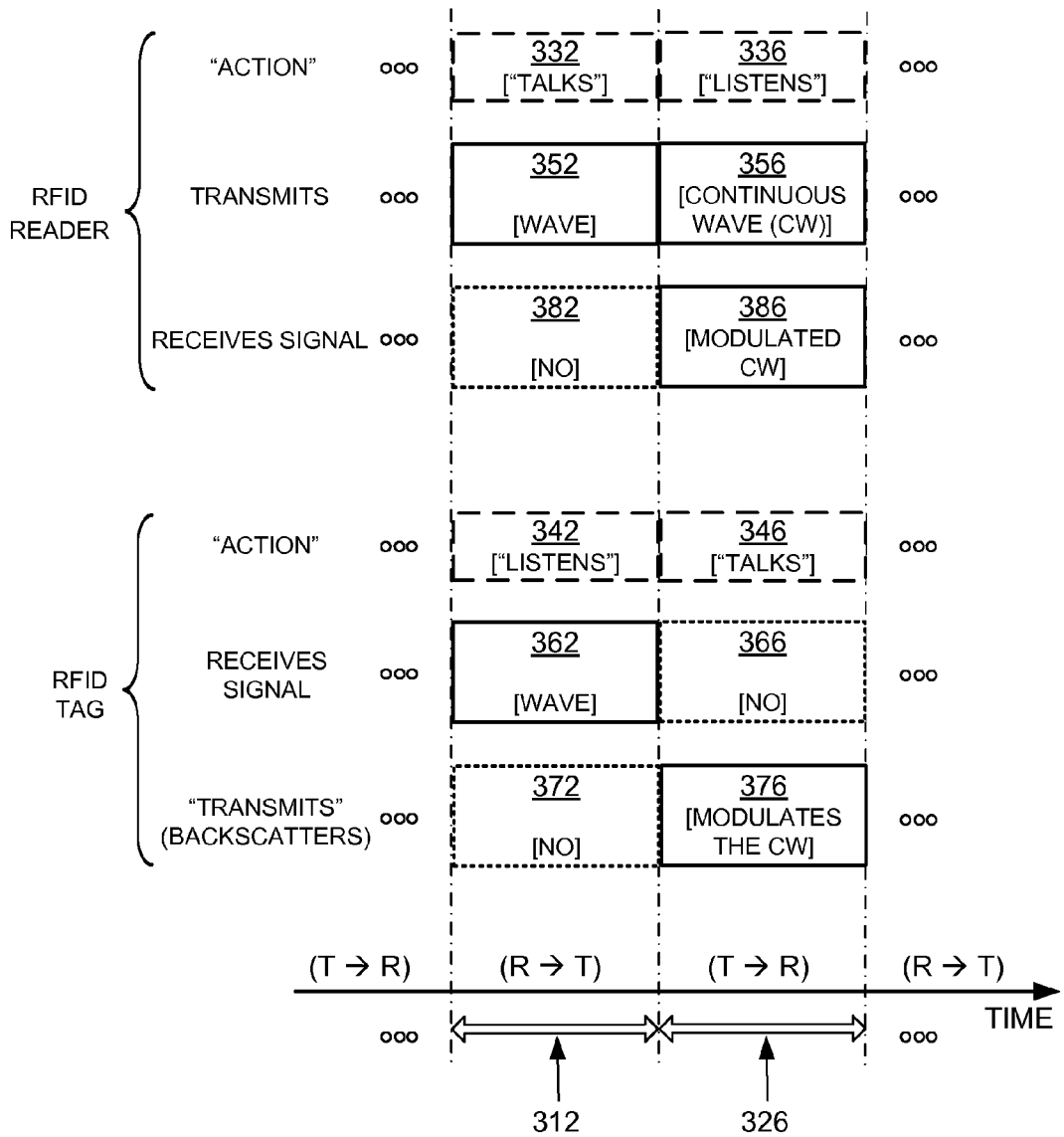
FIG. 3 is a conceptual diagram for explaining a half-duplex mode of communication between the components of the RFID system of FIG. 1.

FIG. 3 is a conceptual diagram 300 for explaining the half-duplex mode of communication between the components of the RFID system of FIG. 1, especially when tag 120 is implemented as passive tag 220 of FIG. 2. The explanation is made with reference to a TIME axis, and also to a human metaphor of "talking" and "listening". The actual technical implementations for "talking" and "listening" are now described.

RFID reader 110 and RFID tag 120 talk and listen to each other by taking turns. As seen on axis TIME, when reader 110 talks to tag 120 the communication session is designated as "R→T", and when tag 120 talks to reader 110 the communication session is designated as "T→R". Along the TIME axis, a sample R→T communication session occurs during a time interval 312, and a following sample T→R communication session occurs during a time interval 326. Of course interval 312 is typically of a different duration than interval 326—here the durations are shown approximately equal only for purposes of illustration.

According to blocks 332 and 336, RFID reader 110 talks during interval 312, and listens during interval 326. According to blocks 342 and 346, RFID tag 120 listens while reader 110 talks (during interval 312), and talks while reader 110 listens (during interval 326).

In terms of actual technical behavior, during interval 312, reader 110 talks to tag 120 as follows. According to block 352, reader 110 transmits wave 112, which was first described in FIG. 1. At the same time, according to block 362, tag 120 receives wave 112 and processes it, to extract data and so on. Meanwhile, according to block 372, tag 120 does not backscatter with its antenna, and according to block 382, reader 110 has no wave to receive from tag 120.

During interval 326, tag 120 talks to reader 110 as follows. According to block 356, reader 110 transmits a Continuous Wave (CW), which can be thought of as a carrier signal that ideally encodes no information. As discussed before, this carrier signal serves both to be harvested by tag 120 for its own internal power needs, and also as a wave that tag 120 can backscatter. Indeed, during interval 326, according to block 366, tag 120 does not receive a signal for processing. Instead, according to block 376, tag 120 modulates the CW emitted according to block 356, so as to generate backscatter wave 126. Concurrently, according to block 386, reader 110 receives backscatter wave 126 and processes it.

Figure 4:
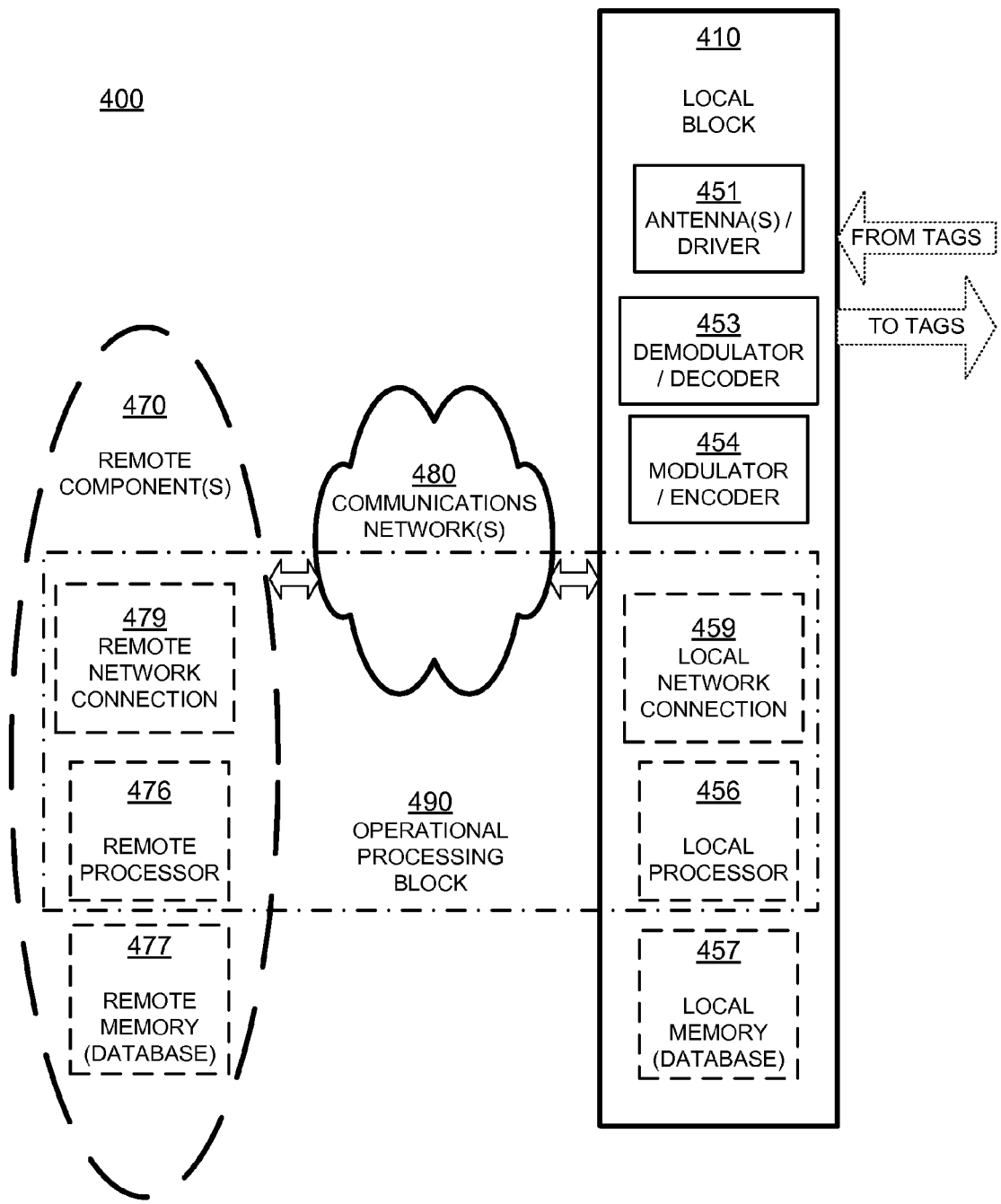
FIG. 4 is a block diagram showing a detail of an RFID reader system, such as the one shown in FIG. 1.

FIG. 4 is a block diagram of a whole RFID reader system 400 according to embodiments. System 400 includes a local block 410, and optionally remote components 470. Local block 410 and remote components 470 can be implemented in any number of ways. It will be recognized that reader 110 of FIG. 1 is the same as local block 410, if remote components 470 are not provided. Alternately, reader 110 can be implemented instead by system 400, of which only the local block 410 is shown in FIG. 1.

Local block 410 is responsible for communicating with tags. Local block 410 includes a block 451 of an antenna and a driver of the antenna for sending signals to and receiving signals from the tags. Some readers, like that shown in local block 410, contain a single antenna and driver. Some contain multiple antennas and drivers and a method to switch signals among them, including sometimes using different antennas for transmitting and for receiving. And some readers contain multiple antennas and drivers that can operate simultaneously. A demodulator/decoder block 453 demodulates and decodes RF waves received from the tags via antenna(s)/drivers block 451. Modulator/encoder block 454 encodes and modulates an RF wave that is to be transmitted to the tags via antenna(s)/drivers block 451.

Local block 410 additionally includes an optional local processor 456. Processor 456 may be implemented in any number of ways known in the art. Such ways include, by way of examples and not of limitation, digital and/or analog processors such as microprocessors and digital-signal processors (DSPs); controllers such as microcontrollers; software running in a machine such as a general purpose computer; programmable circuits such as Field Programmable Gate Arrays (FPGAs), Field-Programmable Analog Arrays (FPAAs), Programmable Logic Devices (PLDs), Application Specific Integrated Circuits (ASIC), any combination of one or more of these; and so on. In some cases, some or all of the decoding function in block 453, the encoding function in block 454, or both, may be performed instead by processor 456. In some cases processor 456 may implement an encryption or authorization function; in some cases one or more of these functions can be distributed among other blocks such as encoding block 454, or may be entirely incorporated in another block.

Local block 410 additionally includes an optional local memory 457. Memory 457 may be implemented in any number of ways known in the art. Such ways include, by way of examples and not of limitation, nonvolatile memories (NVM), read-only memories (ROM), random access memories (RAM), any combination of one or more of these, and so on. These memories can be implemented separately from processor 456, or in a single chip with processor 456, with or without other components. Memory 457, if provided, can store programs for processor 456 to run, if needed.

In some embodiments, memory 457 stores data read from tags, or data to be written to tags, such as Electronic Product Codes (EPCs), Tag Identifiers (TIDs) and other data. Memory 457 can also include reference data that is to be compared to the EPC codes, instructions and/or rules for how to encode commands for the tags, modes for controlling antenna(s)/drivers 451, and so on. In some of these embodiments, local memory 457 is provided as a database.

Some components of local block 410 may treat the data as analog, such as the antenna(s)/drivers block 451. Other components such as memory 457 may treat the data as digital. At some point there is a conversion between analog and digital. Based on where this conversion occurs, a whole reader may be characterized as "analog" or "digital", but most readers contain a mix of analog and digital functionality.

If remote components 470 are indeed provided, they are coupled to local block 410 via an electronic communications network 480. Network 480 can be a Local Area Network (LAN), a Metropolitan Area Network (MAN), a Wide Area Network (WAN), a network of networks such as the internet, or a mere local communication link, such as a USB, PCI, and so on. In turn, local block 410 then includes a local network connection 459 for communicating with network 480. Communications on the network can be secure, such as if they are encrypted or physically protected, or insecure, such as if they are not encrypted or otherwise protected.

There can be one or more remote component(s) 470. If more than one, they can be located at the same location, or in different locations. They can access each other and local block 410 via network 480, or via other similar networks, and so on. Accordingly, remote component(s) 470 can use respective remote network connections. Only one such remote network connection 479 is shown, which is similar to local network connection 459, etc.

Remote component(s) 470 can also include a remote processor 476. Processor 476 can be made in any way known in the art, such as was described with reference to local processor 456. Remote processor 476 may also implement an encryption function, similar to local processor 456.

Remote component(s) 470 can also include a remote memory 477. Memory 477 can be made in any way known in the art, such as was described with reference to local memory 457. Memory 477 may include a local database, and a different database of a Standards Organization, such as one that can reference EPCs. Remote memory 477 may also contain information associated with phase amplitude selection or the like, similar to local memory 457.

Of the above-described elements, it may be advantageous to consider a combination of these components, designated as operational processing block 490. Block 490 includes the following components: local processor 456, remote processor 476, local network connection 459, remote network connection 479, and by extension an applicable portion of network 480 that links remote network connection 479 with local network connection 459. The portion can be dynamically changeable, etc. In addition, block 490 can receive and decode RF waves received via antenna(s)/drivers 451, and cause antenna(s)/drivers 451 to transmit RF waves according to what it has processed.

Block 490 includes either local processor 456, or remote processor 476, or both. If both are provided, remote processor 476 can be made such that it operates in a way complementary with that of local processor 456. In fact, the two can cooperate. It will be appreciated that block 490, as defined this way, is in communication with both local memory 457 and remote memory 477, if both are present.

Accordingly, block 490 is location agnostic, in that its functions can be implemented either by local processor 456, or by remote processor 476, or by a combination of both. Some of these functions are preferably implemented by local processor 456, and some by remote processor 476. Block 490 accesses local memory 457, or remote memory 477, or both for storing and/or retrieving data.

Reader system 400 operates by block 490 generating communications for RFID tags. These communications are ultimately transmitted by antenna(s)/drivers block 451, with modulator/encoder block 454 encoding and modulating the information on an RF wave. Then data is received from the tags via antenna(s)/drivers block 451, demodulated and decoded by demodulator/decoder block 453, and processed by processing block 490.

Embodiments of an RFID reader system can be implemented as hardware, software, firmware, or any combination. It is advantageous to consider such a system as subdivided into components or modules. A person skilled in the art will recognize that some of these components or modules can be implemented as hardware, some as software, some as firmware, and some as a combination. An example of such a subdivision is now described, together with the RFID tag as an additional module.

Figure 5:
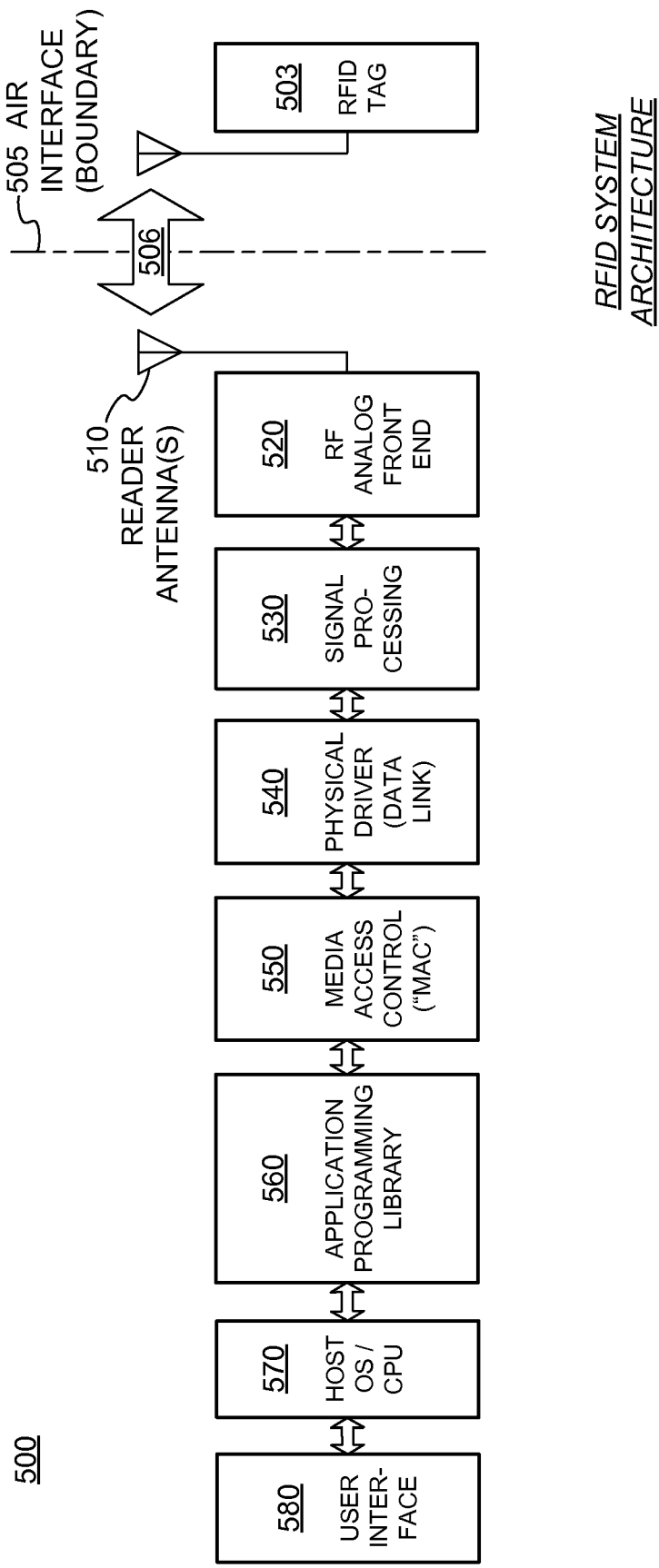
FIG. 5 is a block diagram illustrating an overall architecture of an RFID system according to embodiments.

FIG. 5 is a block diagram illustrating an overall architecture of an RFID reader system 500 according to embodiments. It will be appreciated that system 500 is considered subdivided into modules or components. Each of these modules may be implemented by itself, or in combination with others. In addition, some of them may be present more than once. Other embodiments may be equivalently subdivided into different modules. These modules can be implemented in a variety of ways such as by discrete circuitry, integrated circuits, analog or digital signal processors, FPGAs, microprocessors, databases, interfaces, and so on. It will be recognized that some aspects are parallel with what was described previously.

An RFID tag 503 is considered here as a module by itself. Tag 503 conducts a wireless communication 506 with the remainder, via the air interface 505. It is noteworthy that air interface 505 is really only a boundary, in that signals or data that pass through it are not intended to be transformed from one thing to another. Specifications as to how readers and tags communicate with each other, for example Class-1 Generation-2 UHF RFID Protocol for Communications at 860 MHz—960 MHz ("Gen2 Protocol") by EPCglobal, Inc. properly characterizes that boundary as an interface. Contents of Gen2 Specification version 1.2 are hereby incorporated by reference.

RFID reader system 500 includes one or more antennas 510, and an RF Analog Front End 520, for interfacing with antenna(s) 510. These can be made as described above.

RFID reader system 500 also includes a Signal Processing module 530. In one embodiment, module 530 exchanges waveforms with Front End 520, such as I and Q waveform pairs.

RFID reader system 500 also includes a Physical Driver module 540, which is also known as Data Link. In one embodiment, module 540 exchanges bits with module 530. Data Link 540 can be the stage associated with framing of data.

RFID reader system 500 additionally includes a Media Access Control module 550, which is also known as MAC layer. In one embodiment, module 550 exchanges packets of bits with module 540. MAC layer 550 can make decisions for sharing the medium of wireless communication, which in this case is the air interface.

RFID reader system 500 moreover includes an Application Programming Library module 560. This module can include Application Programming Interfaces (APIs), other objects, etc.

All of these RFID reader system functionalities can be supported by one or more processors. One of these processors can be considered a host processor. Such a host processor might include a Host Operating System (OS) and/or Central Processing Unit (CPU) 570. In some embodiments, the processor is not considered as a separate module, but one that includes some of the above-mentioned modules of system 500. In some embodiments the one or more processors may perform operations associated with influencing a behavior of a tag based on the tag's public or private profile.

A user interface 580 is coupled to library 560, for accessing the APIs. User interface 580 can be manual, automatic, or both. It can be supported by the host processor 570 mentioned above, or a separate processor, etc.

It will be observed that the modules of RFID reader system 500 form a chain. Adjacent modules in the chain can be coupled by appropriate instrumentalities for exchanging signals. These instrumentalities include conductors, buses, interfaces, and so on. These instrumentalities can be local, e.g. to connect modules that are physically close to each other, or over a network, for remote communication.

The chain is used in one direction for receiving RFID waveforms and in the other direction for transmitting RFID waveforms. In receiving mode, antenna(s) 510 receives wireless waves, which are in turn processed successively by the various modules in the chain. Processing can terminate in any one of the modules. In transmitting mode, waveform initiation can be in any one of the modules. Ultimately, signals are routed to antenna(s) 510 to be transmitted as wireless waves.

The architecture of RFID reader system 500 is presented for purposes of explanation, and not of limitation. Its particular subdivision into modules need not be followed for creating embodiments. Furthermore, the features of the present disclosure can be performed within a single one of the modules, or by a combination of them.

As mentioned previously, embodiments are directed to RFID readers with sub-orthogonal self-jammer cancellation. While embodiments are typically implemented using RF circuits, discrete or integrated, made in a variety of ways, they may also include programs, and methods of operation of the programs. A program is generally defined as a group of steps or operations leading to a desired result, due to the nature of the elements in the steps and their sequence. A program is usually advantageously implemented as a sequence of steps or operations for a processor, such as the processors described above.

Performing the steps, instructions, or operations of a program requires manipulating physical quantities. Usually, though not necessarily, these quantities may be transferred, combined, compared, and otherwise manipulated or processed according to the steps or instructions, and they may also be stored in a computer-readable medium. These quantities include, for example, electrical, magnetic, and electromagnetic charges or particles, states of matter, and in the more general case can include the states of any physical devices or elements. It is convenient at times, principally for reasons of common usage, to refer to information represented by the states of these quantities as bits, data bits, samples, values, symbols, characters, terms, numbers, or the like. It should be borne in mind, however, that all of these and similar terms are associated with the appropriate physical quantities, and that these terms are merely convenient labels applied to these physical quantities, individually or in groups.

Embodiments furthermore include storage media. Such media, individually or in combination with others, have stored thereon instructions of a program made according to the embodiments. A storage medium according to the embodiments is a computer-readable medium, such as a memory, and is read by a processor of the type mentioned above. If a memory, it can be implemented in a number of ways, such as Read Only Memory (ROM), Random Access Memory (RAM), etc., some of which are volatile and some nonvolatile.

Even though it is said that the program may be stored in a computer-readable medium, it should be clear to a person skilled in the art that it need not be a single memory, or even a single machine. Various portions, modules or features of it may reside in separate memories, or even separate machines. The separate machines may be connected directly, or through a network such as a local access network (LAN) or a global network such as the Internet. Often, for the sake of convenience only, it is desirable to implement and describe a program as software. The software can be unitary, or thought of in terms of various interconnected distinct software modules.

Figure 6:
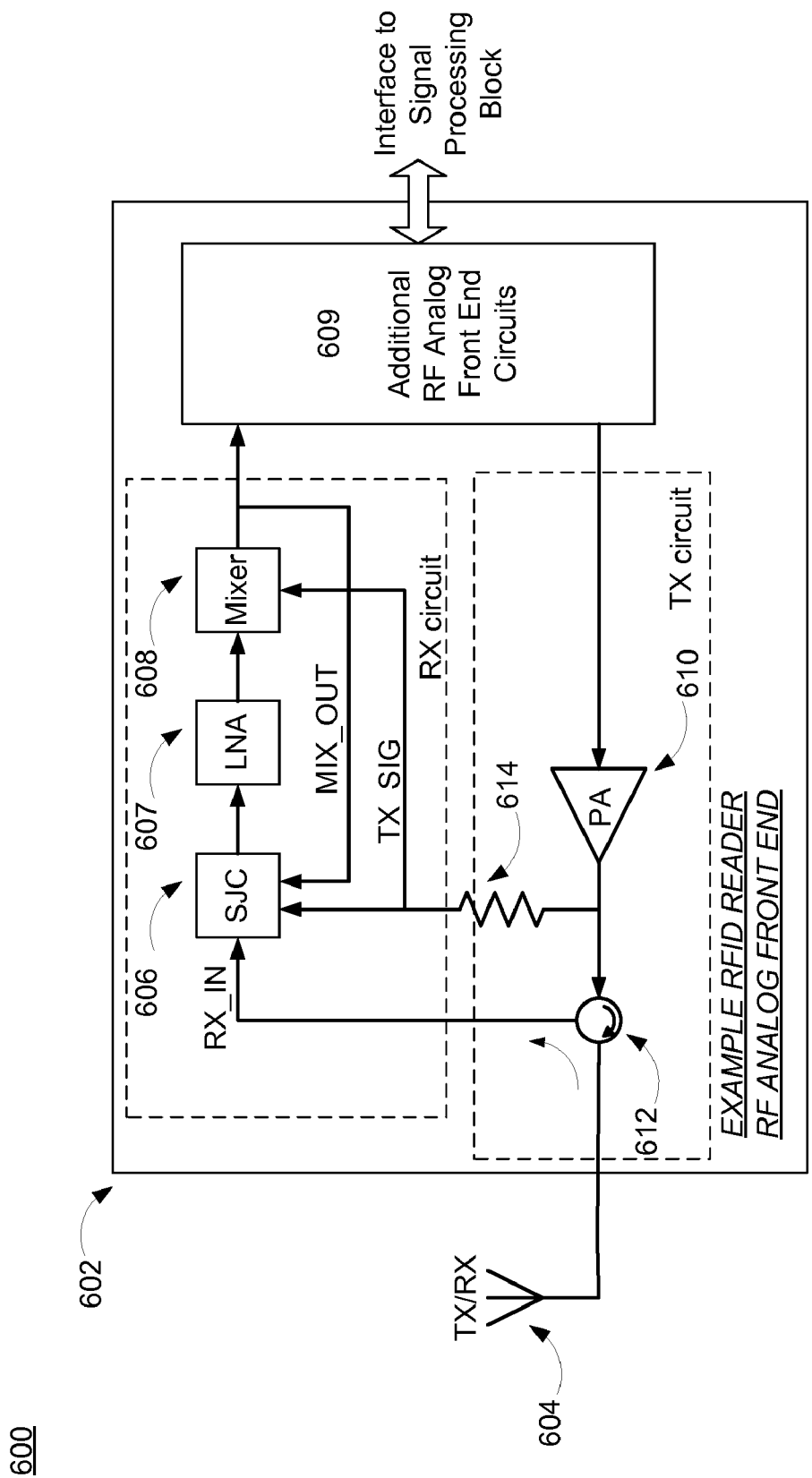
FIG. 6 illustrates an example single-antenna RFID reader RF analog front end, where sub-orthogonal self-jammer cancellation methods according to embodiments are implemented.

FIG. 6 illustrates an RFID reader RF analog front end 602, which may be RF analog front end 520 of the reader shown in FIG. 5, where sub-orthogonal self-jammer cancellation methods according to embodiments are implemented.

RFID readers may have a single antenna that is shared between the transmit (TX circuit) and receive (RX circuit) circuitry or an antenna shared by the circuits. Diagram 600 illustrates an example for the first case, where circulator 612 in RF analog front end 602 is used to isolate the transmit circuitry (TX circuit), which includes of power amplifier (PA) 610 and includes additional circuits in 609, and the receive circuitry (RX circuit), which includes of self-jammer cancellation circuit (SJC) 606, low noise amplifier circuit (LNA) 607, receive mixer 608, and includes additional circuits in 609. Antenna 604 is used by both the receive circuitry and the transmit circuitry. Circulators, such as 612, are directional RF devices with the property of providing low-loss connectivity between a signal input to a circulator port and a signal output at the next circulator port in the circulator direction, which is clockwise for circulator 612 in FIG. 6.

Circulators provide isolation between an input port and the adjacent port in the other direction. In FIG. 6 the output of power amplifier (PA) 610 drives circulator 612, and the circulator provides a low loss path between the PA output and antenna 604, which is connected to the adjacent clockwise circulator port. Circulator 612 provides high isolation between the PA output and the receive circuitry signal path input RX_IN. However signals received from the antenna back into the circulator are connected to RX_IN with low loss because RX_IN is the adjacent clockwise circulator port relative to the antenna. Sub-orthogonal self-jammer cancellation methods according to embodiments are typically implemented at SJC circuit 606 in the receive circuitry. A high-impedance tap (resistor 614) at the output of a power amplifier 610 generates a signal TX_SIG which is used as an input to SJC circuit 606 and as a local oscillator input signal for driving receive mixer 608. Additional inputs to SJC circuit 606 include RX_IN from circulator 612 and MIX_OUT from receive mixer 608. The output of SJC circuit 606 drives the input of LNA 607.

As shown in FIG. 3, the reader transmits a continuous wave (CW) to the tag during "T→R" (tag to reader) communication sessions. This CW supplies power to the tag and serves as a carrier for tag backscatter modulation signaling to the reader. However with a shared transmit and receive antenna, as used in the RF analog front end shown in FIG. 6, some of the transmitted CW power will be reflected from the antenna 604 back through the circulator 612 and into RX_IN. This reflected CW is referred to as a self-jammer, and is typically much larger than the backscatter-modulated waveform from the tag. Reflection from a shared transmit and receive antenna is not the only mechanism that can cause a self-jammer. An RFID system with separate antennas for receive and transmit may also have a self-jammer, which occurs due to coupling between the transmit and receive antennas.

Since the desired tag backscatter modulation is superimposed on the self-jammer, the self-jammer amplitude limits the maximum gain that can be used in receiver LNA 607 without causing significant signal compression. By limiting LNA gain, a large amplitude self-jammer reduces the modulation signal amplitude in subsequent receiver stages and thus also reduces receiver SNR (signal to noise ratio) and sensitivity. The self-jammer also introduces amplitude modulated (AM) noise from the reader transmit path into the receiver that cannot be removed in the receiver mixer 608.

To allow higher receiver LNA gain, thus increasing receiver SNR and sensitivity, and to reduce the amount of reader transmit path AM noise introduced into the receiver, it is desirable to reduce the amplitude of the self-jammer before it enters the receiver LNA. A known and practiced technique for reducing self-jammer amplitude in RFID readers is to create a replica of the self-jammer, equal in amplitude but with opposite phase, and to sum this replica with the existing signal at the receiver input, which otherwise consists of the tag backscatter modulation and the self-jammer. Since the replica and the self-jammer have the same amplitude but opposite phase, they cancel and the resulting signal is ideally just the tag modulation. This technique is known as self-jammer cancellation and is implemented in SJC circuit 606.

Figure 7:
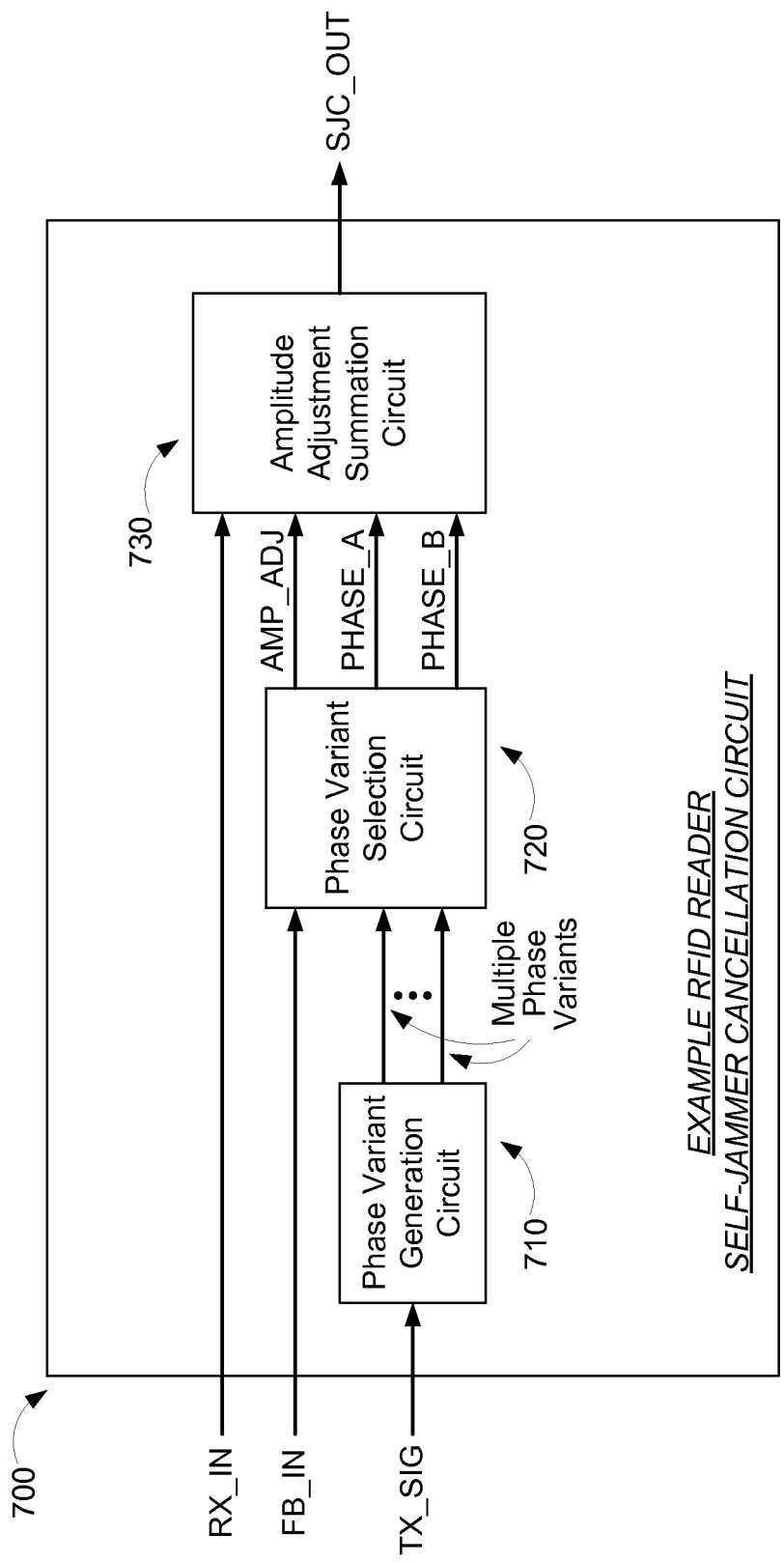
FIG. 7 is a block diagram of an example self-jammer cancellation circuit according to embodiments.

FIG. 7 shows an example self-jammer cancellation circuit 700, which corresponds to SJC circuit 606 in FIG. 6. SJC circuit 700 consists of three major sub-circuits. "Phase variant generation circuit" 710 receives an input signal TX_SIG, which is typically derived from a reader transmit signal, such as the PA output as shown in FIG. 6, or alternately from a local oscillator. "Phase variant generation circuit" 710 creates, as outputs, multiple phase variants of input signal TX_SIG. The number of output phase variants and the phase difference between them may vary depending on the specific implementation. "Phase variant selection circuit" 720 receives the multiple phase variants and selects two of them as outputs PHASE_A and PHASE_B. "Phase variant selection circuit" 720 also generates output signal AMP_ADJ, which may be analog or digital, for the purpose of adjusting the amplitude of the selected phase variants. AMP_ADJ is provided as an input signal to "amplitude adjustment summation circuit" 730, which uses AMP_ADJ to implement the amplitude adjustment of the selected phase variants PHASE_A and PHASE_B. Phase variant selection may be done in various ways but typically uses an additional input signal FB_IN, which provides feedback on the completeness of the self-jammer cancellation. In FIG. 6 the output MIX_OUT of the receive mixer (608) corresponds to FB_IN in FIG. 7.

Any uncancelled self-jammer signal present at the output of SJC circuit 606 will pass through LNA 607 to mixer 608, and will be mixed down to DC by the mixer. The magnitude of DC present in MIX_OUT is thus an indication of self-jammer cancellation completeness. "Phase variant selection circuit" 720 in SJC circuit 700 can optimize cancellation completeness by selecting phase variants and by controlling AMP_ADJ to adjust their amplitudes in "amplitude adjustment summation circuit" 730. Phase selection and amplitude adjustment may be implemented by an algorithm that minimizes the magnitude of DC present in MIX_OUT, which may be connected to the FB_IN input of SJC circuit 700. Phase selection and amplitude adjustment may also be implemented by hardware or a combination of hardware and software. Portions of the phase variant selection circuit may be shared with other circuits in the reader. For example the magnitude of DC present in MIX_OUT may be determined from the digital output of a receiver analog to digital converter (ADC) following the mixer. This ADC may be located in block 609 of FIG. 6. And the circuit that processes the ADC digital output to determine the magnitude of DC present in MIX_OUT may be located in signal processing block 530 in FIG. 5.

Other implementations of selecting two phase variants and adjusting their amplitudes in an SJC circuit may also be used. The sum of the two selected and scaled phase variant signals PHASE_A and PHASE_B is the cancellation replica signal discussed above. This summation is implemented in "amplitude adjustment summation circuit" 730, which also sums the cancellation replica with input signal RX_IN to create the output SJC_OUT. RX_IN is the receiver input signal from circulator 612 in FIG. 6, and SJC_OUT is the output, which has the self-jammer removed, of "self-jammer cancellation circuit" 606 in FIG. 6. In some implementations "amplitude adjustment summation circuit" 730 may contain two summation circuits, a first summation circuit that sums PHASE_A and PHASE_B to create the cancellation replica, and a second summation circuit that sums the cancellation replica with RX_IN to create SJC_OUT. In other implementations "amplitude adjustment summation circuit" 730 may contain a single, three input summation circuit that sums PHASE_A, PHASE_B, and RX_IN to create SJC_OUT directly.

The following paragraphs describe the mathematical basis for both orthogonal SJC and sub-orthogonal SJC, and show that both can be effective in canceling a self-jammer. Prior art RFID self-jammer cancellation circuits use orthogonal SJC because it is a simple and effective method based on well known quadrature signal processing techniques commonly used in radio receivers, including RFID receivers. Sub-orthogonal SJC is not as simple as orthogonal SJC, however it is also effective in canceling a self-jammer, and it can provide a significant advantage in lower power consumption as is shown below.

Figure 8A:
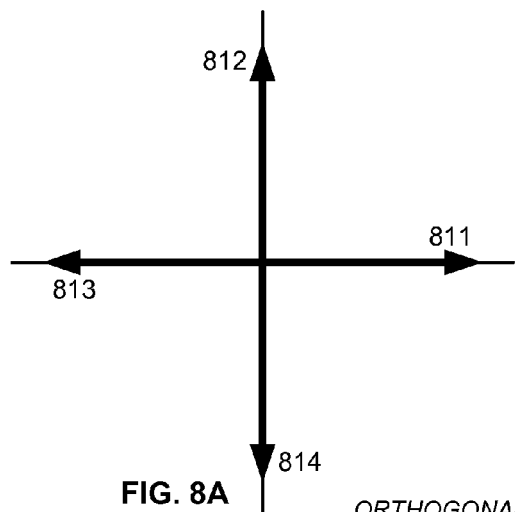
FIG. 8 illustrates orthogonal self-jammer cancellation vectors and example sub-orthogonal self-jammer cancellation vectors.
Figure 8B:
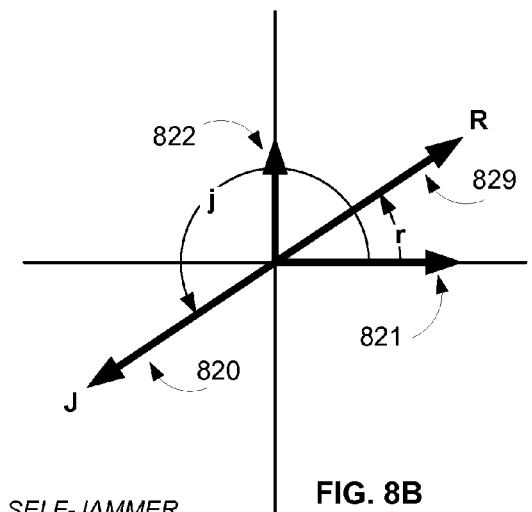

The mathematical basis for the prior-art four-phase (also known as orthogonal or quadrature) SJC method, referred to here as orthogonal SJC, is shown in FIGS. 8A and 8B, in which the amplitudes and phases of CW signals are represented by the magnitudes and angles of corresponding vectors. The four orthogonal vectors 811, 812, 813, and 814 in FIG. 8A are the phase variant signals used to generate the SJC replica. The phase difference between adjacent phase variants in FIG. 8A is 90 degrees. The self-jammer is vector 820 in FIG. 8B, with amplitude J and phase j, and the cancellation replica is vector 829, with amplitude R and phase r.

Cancellation replica vector 829 is created by summing the two selected phase variant vectors 821 and 822, which are derived from phase variant vectors 811 and 812 by adjusting their amplitudes such that the cancellation vector amplitude equals the self-jammer amplitude (R=J), and the cancellation vector phase is opposite to the self-jammer phase (r=j±180 degrees). A self-jammer with any amplitude and phase may be cancelled by selecting two of the orthogonal phase variants in FIG. 8A, adjusting their amplitudes to create a cancellation replica with the same amplitude as and opposite phase to the self-jammer, and summing the cancellation replica with the self-jammer. The phase difference between the two phase variants used by orthogonal SJC to create the cancellation replica is 90 degrees. A self-jammer with any amplitude and phase may also be cancelled by selecting more than two phase variants.

Figure 8C:
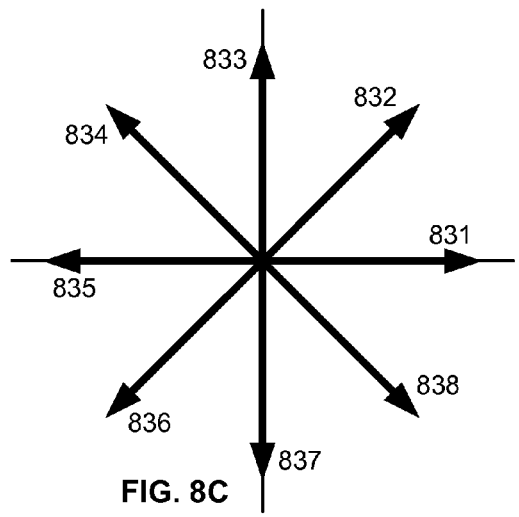
Figure 8D:
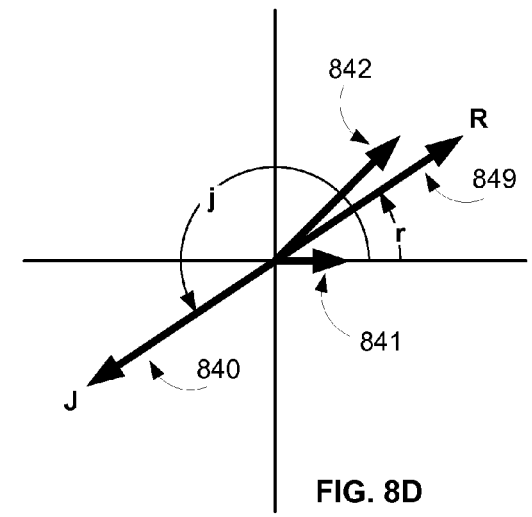

FIGS. 8C and 8D illustrate the mathematical basis for sub-orthogonal self-jammer cancellation. Vector 840 represents the self-jammer and vector 849 represents the cancellation replica. Vectors 831, 832, 833, 834, 835, 836, 837, and 838 represent eight phase variant signals used to generate the SJC replica. The phase difference between adjacent phase variants in FIG. 8C is 45 degrees. This is substantially smaller than the 90 degree phase difference between the FIG. 8A phase variants used by orthogonal SJC. As will be shown later, this smaller phase difference provides the benefit of a substantial reduction in SJC power consumption. Although a phase difference of 45 degrees is shown as an example in FIG. 8C, a smaller phase difference, such as 30 degrees or less, can be used for sub-orthogonal SJC and will provide somewhat larger power reduction. A phase difference larger than 45 degrees, but still substantially less than 90 degrees, such as 60 degrees, may also be used, with somewhat smaller power reduction. It is desirable, but not necessary, to use an even number of phase variants because this choice allows the phase variant signals to be differential signals, in which each phase variant signal is coupled with its opposite in phase. Differential signals are less susceptible to common-mode noise and may improve SJC performance. In FIG. 8D two of the phase variants, represented by vectors 841 and 842, are selected and summed to create the cancellation replica. The two phase variants selected are the phase variant with the closest phase less than the desired phase of the cancellation replica, and the phase variant with the closest phase greater than the desired phase of the cancellation replica. The amplitudes of the two selected phase variants are adjusted such that the cancellation vector amplitude equals the self-jammer amplitude (R=J), and the cancellation vector phase is opposite to the self-jammer phase (r=j±180 degrees). A self-jammer with any amplitude and phase may be cancelled by selecting two of the phase variants in FIG. 8C, adjusting their amplitudes to create a cancellation replica with the same amplitude as and opposite phase to the self-jammer, and summing the cancellation replica with the self-jammer. The phase difference between the two selected phase variants used by the sub-orthogonal SJC example in FIG. 8D to create the cancellation replica is 45 degrees.

FIGS. 8C and 8D illustrate an example of sub-orthogonal SJC in which a complete set of eight phase variants, vectors 831, 832, 833, 834, 835, 836, 837, and 838, with phase differences of 45 degrees are generated, and two of these vectors, 831 and 832, are selected and adjusted. These are vectors 841 and 842 in FIG. 8D, which are summed to create the cancellation replica vector 849. The other six phase variants in FIG. 8C, vectors 833, 834, 835, 836, 837, and 838, are not used in this example to create the cancellation replica vector 849. In some sub-orthogonal SJC embodiments less than a complete set of phase variants may be generated. For example, only vectors 831, 832, 833, and 834, or only vectors 831 and 832 could be generated. The cancellation replica vector can be created as long as the set of generated vectors contains at least the two phase variants, one with the closest phase less than the desired phase of the cancellation replica, and the other with the closest phase greater than the desired phase of the cancellation replica vectors. In this example these phase variants are vectors 831 and 832.

Figure 10:
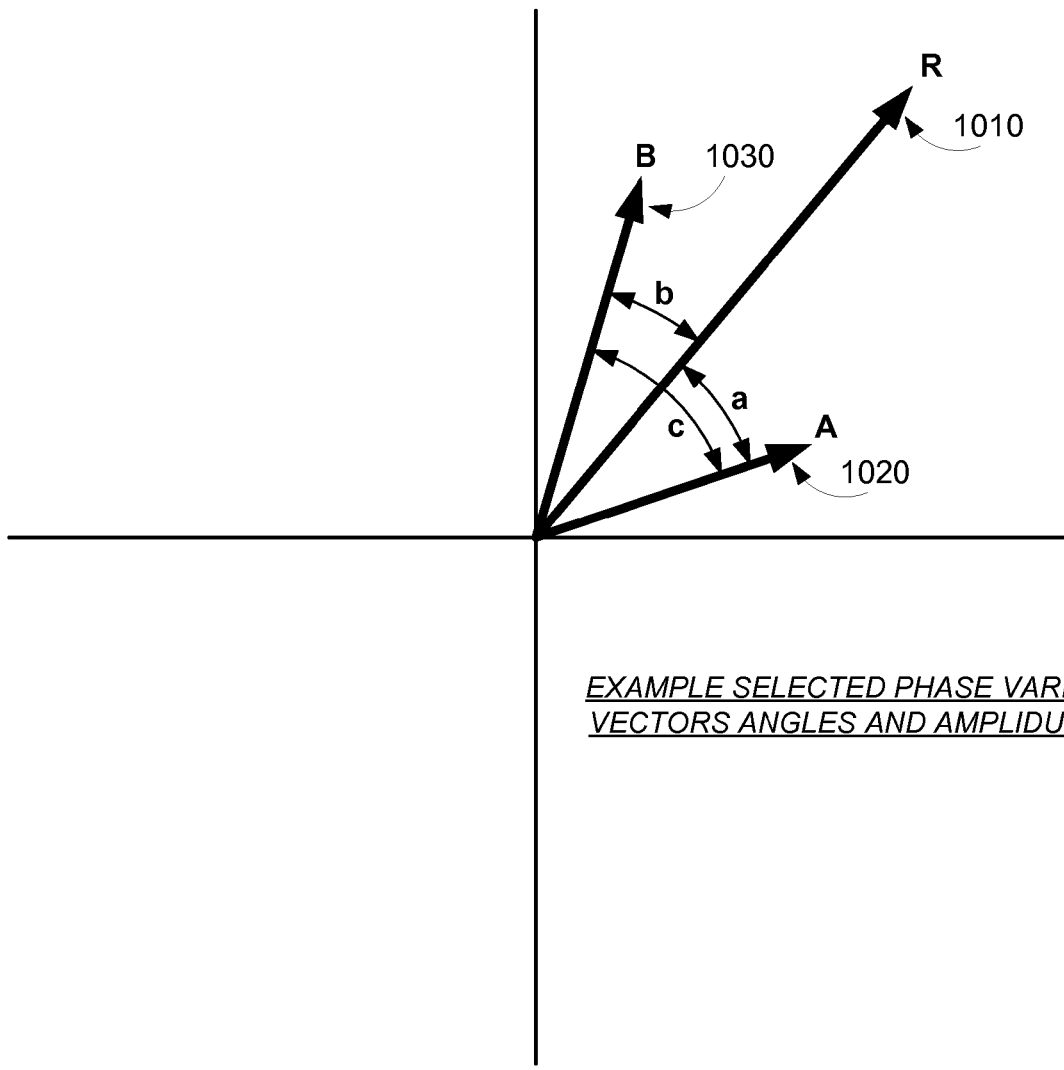
FIG. 10 illustrates an example of two selected phase variant vectors and a cancellation replica vector, showing their angles and amplitudes.

FIG. 10 illustrates the phase angles and amplitudes of two selected phase variant vectors 1020 and 1030 used to create a cancellation replica vector 1010. The required amplitudes, A and B, for the two selected phase variant vectors that are summed to create the cancellation replica vector can be derived from the two conditions described by the following equations:

$$A \sin a = B \sin b \qquad (1)$$

$$R = A \cos a + B \cos b \qquad (2)$$

where R is the amplitude of the cancellation replica vector 1010, a is the phase angle difference between the replica vector and the selected phase variant vector 1020 with amplitude A, and b is the phase angle difference between the replica vector and the selected phase variant vector 1030 with amplitude B. The condition described by equation (1) sets the phase angle of the replica vector, and the condition described by equation (2) sets the magnitude of the replica vector.

Equations (1) and (2) can be solved to determine the lengths of the two selected phase variant vectors:

$$A = R/(\cos a + \sin a/\tan b) \quad (3)$$

$$B = R/(\cos b + \sin b/\tan a) \quad (4)$$

The worst case maximum combined amplitude, A+B, of the two selected phase variant vectors occurs for a cancellation replica phase halfway between them. Thus for orthogonal phase variant vectors with a 90 degree phase difference, the maximum combined selected phase variant vector amplitude is 1.414 R, which occurs when the cancellation replica is 45 degrees from each of the two selected phase variant vectors (a=b=45 degrees). For an example of sub-orthogonal SJC in which the two selected phase variant vectors are selected from a set of eight phase variant vectors equally spaced 45 degrees apart, the maximum combined selected phase variant vector amplitude is 1.082 R, which occurs when the cancellation replica is 22.5 degrees from each of the two selected phase variant vectors (a=b=22.5 degrees). As shown in this example, the combined selected phase variant vector amplitude of 1.082 R for sub-orthogonal SJC is substantially smaller than the combined selected phase variant vector amplitude of 1.414 R for orthogonal SJC.

For the special case discussed above, an expression can be derived for the worst case maximum combined amplitude of the two selected phase variant vectors as a function of the phase angle difference between them. In this special case, the two phase angle differences between each of the selected phase variant vectors and the replica vector are equal (a=b=c/2), where c is the phase angle difference between the two selected phase vectors. From equation (2), $$R = (A+B)\cos a = (A+B)\cos(c/2) \quad (5)$$

Substituting a well known trigonometric identity for cos (c/2) and solving for the combined amplitude, $$A+B = R/sqrt\{(1+\cos c)/2\} \quad (6)$$

Equation (6) shows that the worst case maximum combined amplitude of the two selected phase variant vectors, which will be shown below to be proportional to SJC power consumption, is inversely proportional to the cosine of the angle between the selected phase variants. For orthogonal SJC the angle between the phase variants is 90 degrees with a cosine of zero. As shown by equation (6) this results in a substantially higher combined amplitude for the selected phase variants than for sub-orthogonal SJC in which the angle between the phase variants is substantially less than 90 degrees with a cosine substantially greater than zero.

The length of the projection of one vector onto another is proportional to the cosine of the angle between them. For orthogonal vectors, which are separated by 90 degrees, the cosine of the separation angle is zero and the length of the vector projection is also zero. For sub-orthogonal vectors, which are separated by an angle substantially less than 90 degrees, the cosine of the separation angle is substantially greater than zero and the length of the vector projection is also substantially greater than zero. As shown above the substantially greater than zero cosine of the phase variants used for sub-orthogonal SJC results in a substantially lower maximum amplitude for the selected phase variants than for orthogonal SJC, and as will be shown below, this results in substantially lower power consumption.

Figure 9:
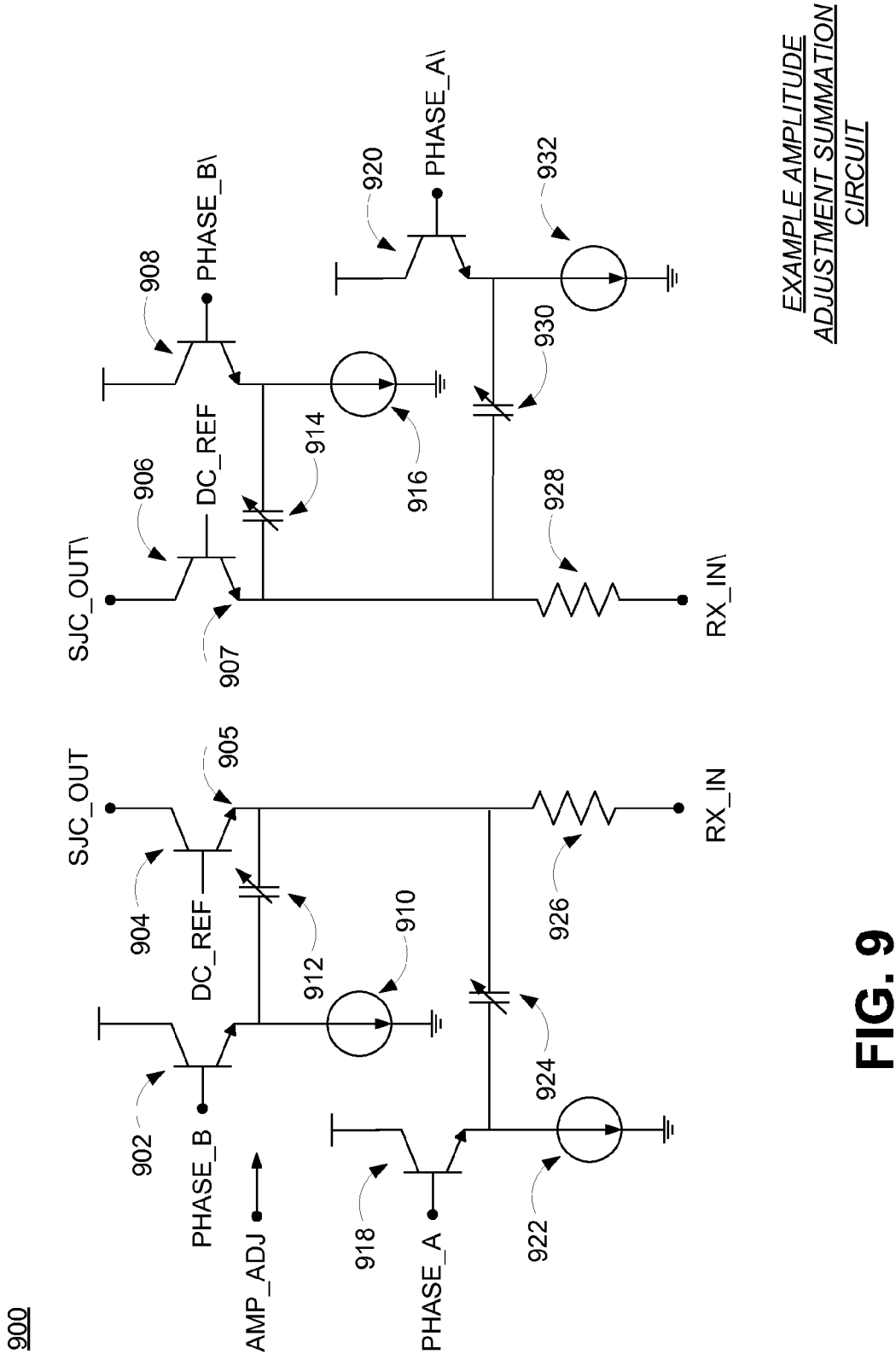
FIG. 9 is a schematic diagram of a differential amplitude adjustment summation circuit, which is used in a self-jammer cancellation system according to embodiments.

FIG. 9 shows an example of an "amplitude adjustment summation circuit" 900, which corresponds to "amplitude adjustment summation circuit" 730 in FIG. 7. This example uses differential signals, in which each of the two sides of the differential signals, such as PHASE_A:PHASE_A\ or SJC_OUT:SJC_OUT\, are substantially opposite in phase to each other. The receiver input signal to "amplitude adjustment summation circuit" 900 is signal RX_IN:RX_IN\, which comes from circulator 612 in FIG. 6 and consists of tag backscatter modulation superimposed on the self-jammer. Input signal RX_IN:RX_IN\ causes a current to flow through resistors 926 and 928, which help set the input impedance, and into the emitters 905 and 907 of NPN common base amplifier transistors 904 and 906. The two differential selected phase variant signals, PHASE_A:PHASE_A\ and PHASE_B:PHASE_B\, are used to create the cancellation replica. Each of the two differential selected phase variant input signals is converted to a differential current signal by a buffer amplifier and output capacitors. For example differential phase variant signal PHASE_A:PHASE_A\ is buffered by emitter follower buffer amplifier transistors 918 and 920, which provide a low output impedance to supply a differential signal current through capacitors 924 and 930, where it is summed with the other differential phase variant signal current derived from phase variant signal PHASE_B:PHASE_B\ at emitters 905 and 907. The sum of the two selected differential phase variant currents creates the differential cancellation replica current, which is also summed at emitters 905 and 907 with the differential input current from RX_IN:RX_IN\ consisting of the superposition of tag backscatter modulation and the self-jammer. The cancellation replica current and the self-jammer current substantially cancel, such that the net differential current that flows through transistors 904 and 906 to the "amplitude adjustment summation circuit" differential output SJC_OUT:SJC_OUT\ is predominately the tag modulation signal current.

The AMP_ADJ input signal to "amplitude adjustment summation circuit" 900 is used to control the amplitudes of the summation currents derived from the two selected differential phase variant input signals, PHASE_A:PHASE_A\ and PHASE_B:PHASE_B\, by varying the capacitance values of capacitors 912, 914, 924, and 930. The AMP_ADJ signal is generated by "phase variant selection circuit" 720. The power consumption of SJC circuit 700 is dominated the power consumption of "amplitude adjustment summation circuit" 900, which is dominated by the power consumed by buffer amplifier bias currents 910, 916, 922, and 932. Because these bias currents must be large enough to supply signal current to the capacitors during the negative half-cycles of the RF signal swing, their minimum required values are determined by the amplitudes of the summation currents derived from the two phase variant input signals. To minimize buffer amplifier bias current, the "amplitude adjustment summation circuit" is typically designed such that each buffer amplifier bias current is adjusted together with the capacitance value of the capacitor driven by the buffer amplifier. Thus, as the capacitors are adjusted by AMP_ADJ to optimize self-jammer cancellation, the buffer amplifier bias currents are also simultaneously adjusted by the same AMP_ADJ input signal to minimize power consumption for the specific self-jammer being received and cancelled.

The power consumption of the buffer amplifiers, and of both the "amplitude adjustment summation circuit" and the overall SJC circuit, is thus proportional to the phase variant summation current amplitudes. SJC circuit power consumption can thus be reduced by reducing the amplitudes of the phase variant summation currents used to create the cancellation replica. As discussed above, the combined phase variant amplitude for sub-orthogonal SJC is substantially smaller than the combined phase variant amplitude for orthogonal SJC. Thus, sub-orthogonal SJC may be implemented with lower power consumption than the orthogonal SJC approach shown in FIGS. 8A and 8B. Lower power consumption provides several benefits, such as longer battery life, reduced heat generation, and lower operating cost.

Figure 11:
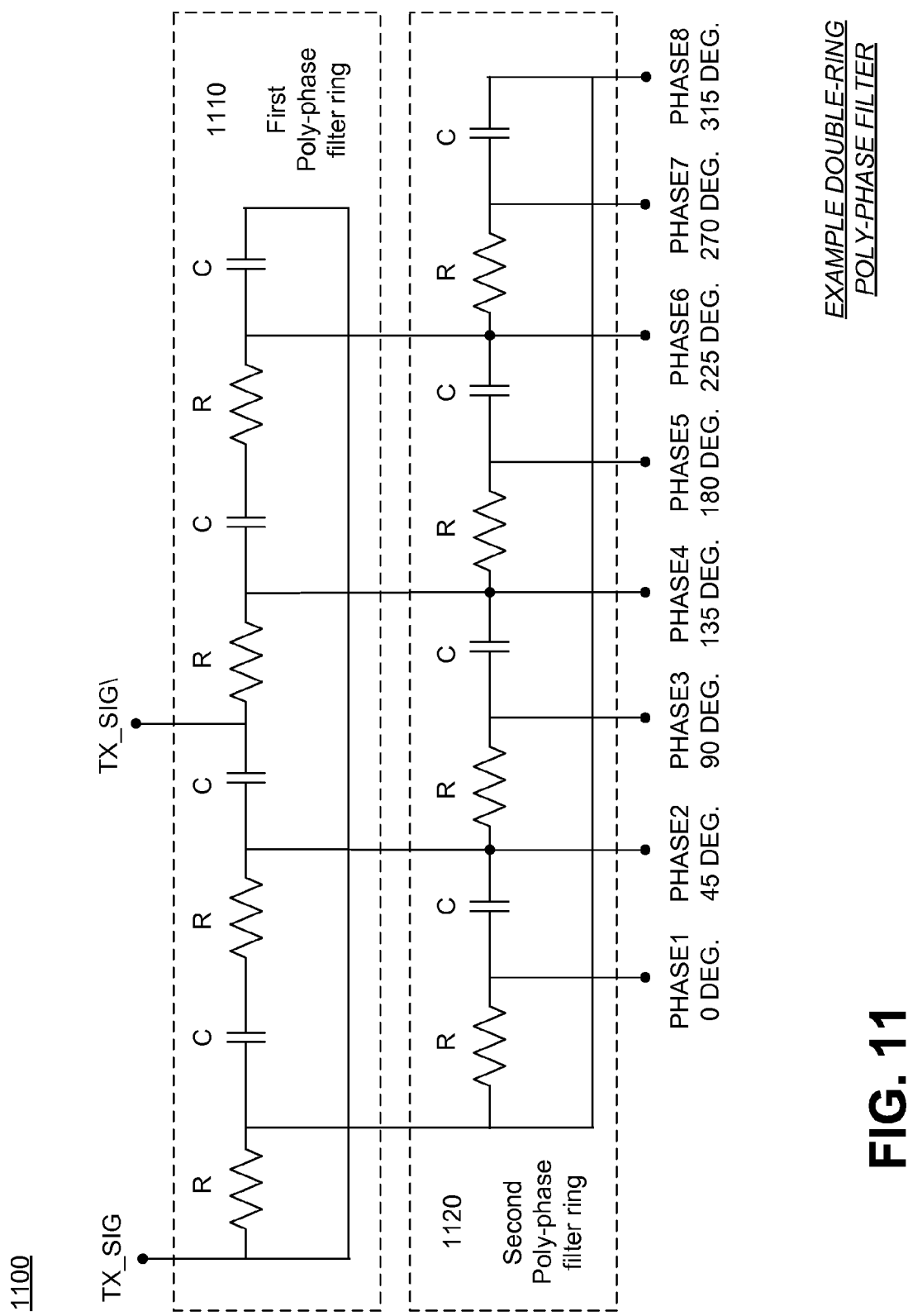
FIG. 11 illustrates schematically an example double-ring, poly-phase filter, which is used in a self-jammer cancellation system according to embodiments.
Figure 12:
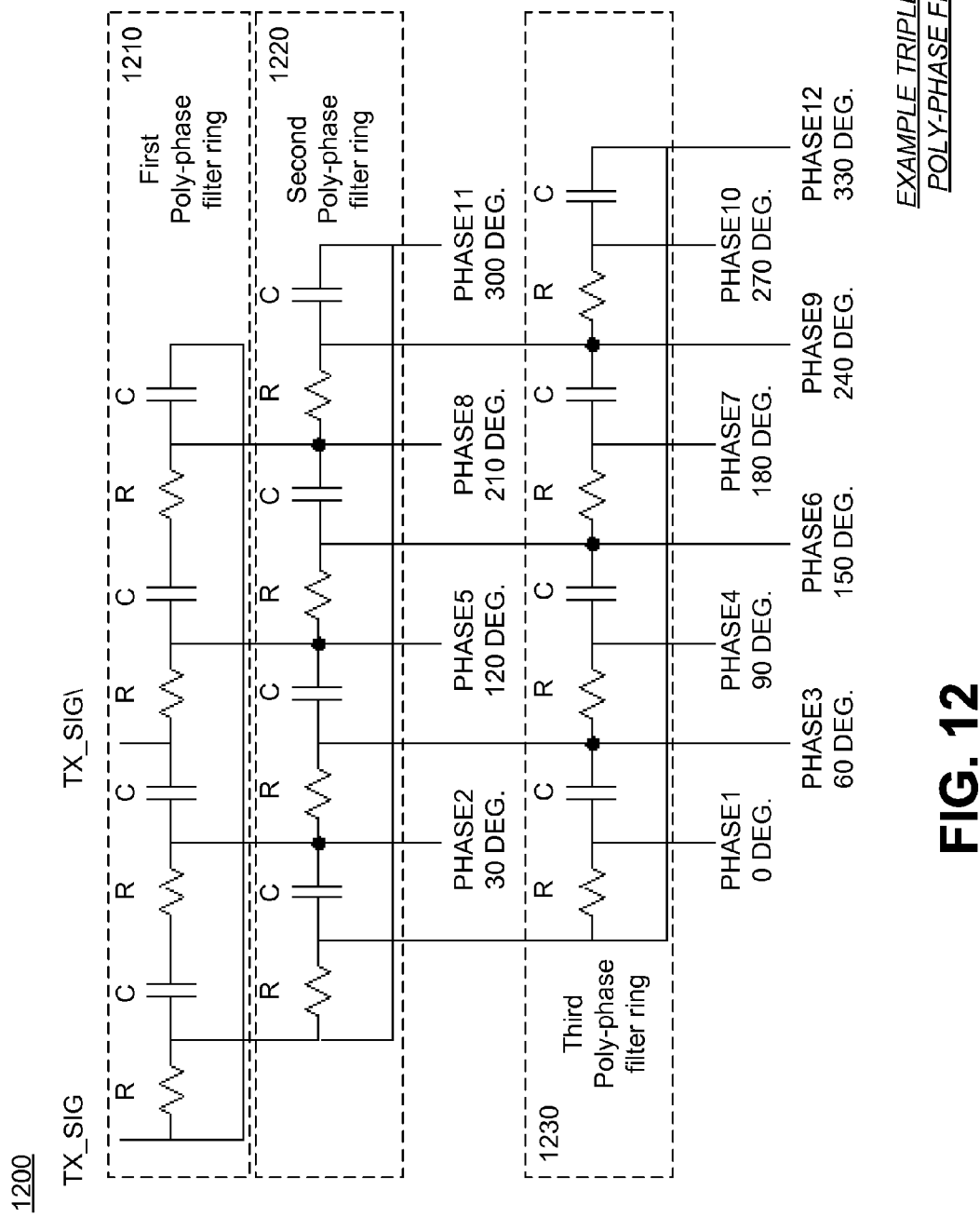
FIG. 12 illustrates schematically an example triple-ring, poly-phase filter, which is used in a self-jammer cancellation system according to embodiments.

FIGS. 11 and 12 illustrate two circuits that may be used to generate the phase variant signals used in a SJC system, such as the phase variant signals shown in FIG. 8C. Diagrams 1100 and 1200 are all examples of "phase variant generation circuits". Circuits 1100 and 1200 generate eight and twelve phase variants respectively, separated by 45 degrees and 30 degrees respectively, and may be used for sub-orthogonal SJC to implement "phase variant generation circuit" 710 in FIG. 7.

FIG. 11 illustrates schematically an example "phase variant generation circuit" implemented as a double-ring, poly-phase filter with one differential input and eight outputs, which are used to generate the phase variant signals, such as those shown in FIG. 8C, in a sub-orthogonal self-jammer cancellation system according to embodiments.

The poly-phase filter illustrated in diagram 1100 includes two interconnected four section poly-phase filter rings with one differential input, TX_SIG:TX_SIG\. The component values are selected such that the phase shift across each resistor is 45 degrees. This allows each section to generate phase outputs of 45 and 90 degrees, with a total of eight outputs for the double ring filter. Thus, the eight phase variant outputs are separated by 45 degrees in phase. The outputs of poly-phase filter 1100 may be configured as differential signals by coupling each output with its opposite in phase, for example PHASE1:PHASE5, PHASE6:PHASE2, etc.

FIG. 12 illustrates schematically an example "phase variant generation circuit" implemented as a triple-ring, poly-phase filter with one differential input and twelve outputs, which are used to generate the phase variant signals, in a sub-orthogonal self-jammer cancellation system according to embodiments.

A sub-orthogonal self-jammer cancellation circuit according to embodiments may employ a single or multiple poly-phase filter rings in a "phase variant generation circuit". Diagram 1200 is an example poly-phase filter circuit with one differential input, TX_SIG:TX_SIG\, and three poly-phase filter rings in which the component values in the ring sections are chosen such that the phase shift across each resistor is 30 degrees. This example triple ring poly-phase filter has twelve phase variant outputs, which are separated by 30 degrees in phase. The outputs of poly-phase filter 1200 may be configured as differential signals by coupling each output with its opposite in phase, for example PHASE1:PHASE7, PHASE9:PHASE3, etc.

According to other embodiments, a sub-orthogonal self-jammer cancellation circuit may be implemented with additional filter rings, different filter sections, tap configurations, and outputs in order to generate more than four phases. While additional phase variants may mean an increased number of components, the consumed power decreases in proportionality to the phase variant amplitudes, which in turn decrease in proportion to a number of the phase variants. Of course, other filter designs may also be employed to generate phase variants.

Embodiments also include methods. Some are methods of operation of an RFID reader or an RFID reader system. Others are methods for controlling an RFID reader or an RFID reader system. Yet others are methods for controlling one or more RFID tags. These methods can be implemented in any number of ways, including the ways described in this document. One such way is by machine operations, of devices of the type described in this document.

Figure 13:
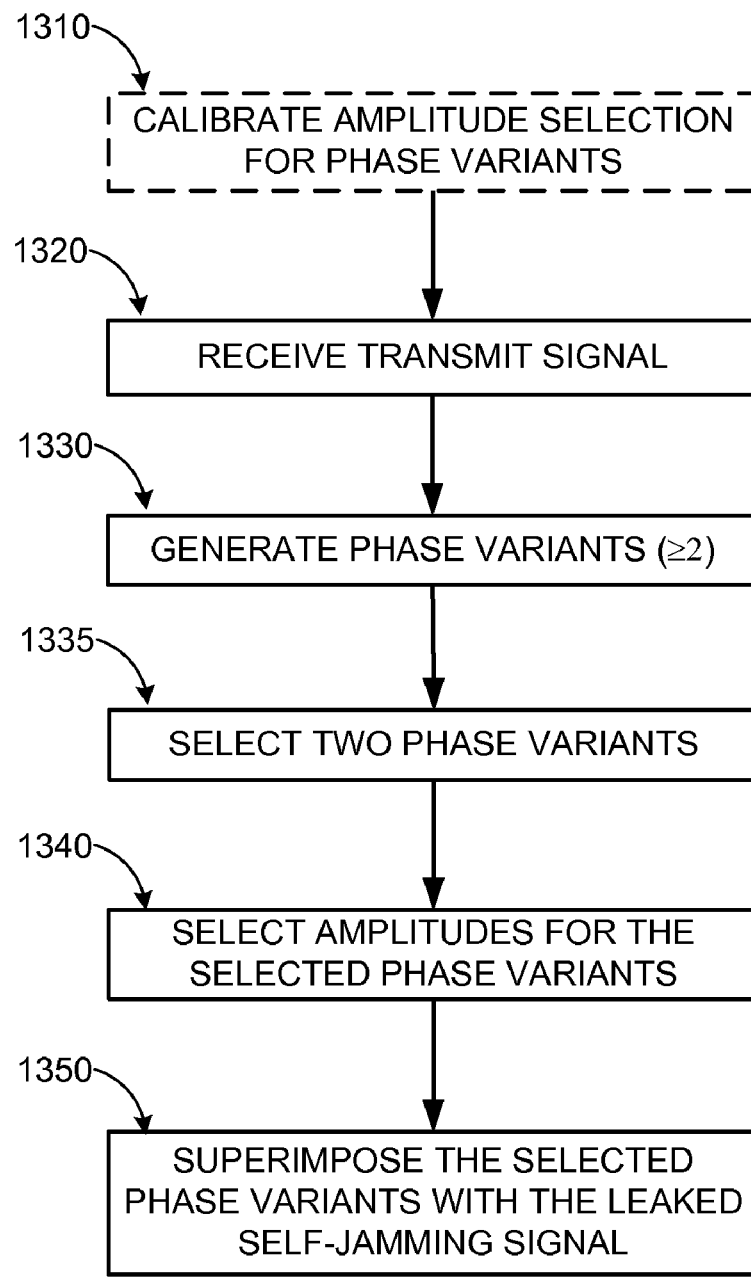
FIG. 13 is a flowchart for a process of an RFID reader performing sub-orthogonal self-jammer cancellation according to embodiments.

FIG. 13 is a flowchart for a process of an RFID reader performing sub-orthogonal self-jammer cancellation according to embodiments. Process 1300 is implemented in self-jammer cancellation circuitry of an RFID reader.

Process 1300 begins at optional operation 1310, in which a calibration process is optionally performed for the selection of the phase-variant amplitudes. The calibration may be repeated after each power-off, antenna change, etc. At operation 1320, a signal associated with a reader transmit signal is received at the self-jammer cancellation circuitry.

At operation 1330 following operation 1320, two or more phase variants are generated from the signal received in operation 1320. At operation 1335 two of the phase variants are selected, where the phase difference between the selected phase variants is substantially less than 90 degrees. The two phase variants selected are the phase variant with the closest phase less than the desired phase of the cancellation vector and the phase variant with the closest phase greater than the desired phase of the cancellation vector. At operation 1340, amplitudes are selected for the two phase variants selected in operation 1335. The amplitudes are selected such that a combination of the two amplitude-adjusted selected phase variants cancels the self-jammer signal at the receive circuitry of the reader.

At operation 1350, the two amplitude-adjusted selected phase variants are superimposed with the self-jammer signal substantially cancelling the self-jammer signal and allowing the received tag signal(s) to be processed by the receive circuitry.

The operations included in process 1300 are for illustration purposes. Performing sub-orthogonal self-jammer cancellation according to embodiments may be implemented by similar processes with fewer or additional steps, as well as in different order of operations using the principles described herein.

The foregoing detailed description has set forth various embodiments of the devices and/or processes via the use of block diagrams and/or examples. Insofar as such block diagrams and/or examples contain one or more functions and/or aspects, it will be understood by those within the art that each function and/or aspect within such block diagrams or examples (e.g. tags and readers according to embodiments) may be implemented individually and/or collectively by a wide range of hardware, software, firmware, or virtually any combination thereof. Those skilled in the art will recognize that some aspects of the RFID self-jammer embodiments disclosed herein, in whole or in part, may be equivalently implemented employing integrated circuits, as one or more computer programs running on one or more computers (e.g., as one or more programs running on one or more computer systems), as one or more programs running on one or more processors (e.g. as one or more programs running on one or more microprocessors), as firmware, or as virtually any combination thereof, and that designing the circuitry and/or writing the code for the software and or firmware would be well within the means of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, configurations, command structures, and the like, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

I claim:

1. A Radio Frequency Identification (RFID) reader comprising:
    a transmit circuit adapted to transmit a first radio frequency (RF) signal;
    a receive circuit adapted to receive a second RF signal;
    a self-jammer cancellation circuit adapted to:
        receive a third RF signal associated with the first RF signal,
        receive a self-jamming signal associated with the first RF signal, wherein the self-jamming signal is a portion of the second RF signal,
        generate at least two distinct phase variants of the third RF signal,
        select two of the distinct phase variants, wherein a vector projection of a first of the selected phase variants on a second of the selected phase variants is substantially greater than zero, and wherein a canceling signal comprising a combination of the selected phase variants is substantially opposite in phase to the self-jamming signal,
        select amplitudes for each of the two selected phase variants such that the canceling signal is substantially equal in amplitude to the self-jamming signal, and
        combine the canceling signal with the second RF signal to reduce an amplitude of the self-jamming signal portion of the second RF signal.

2. The RFID reader circuit of claim 1, wherein the self-jammer cancellation circuit is further adapted to generate a first bias current proportional to the amplitude of the first of the selected phase variants and a second bias current proportional to the amplitude of the second of the selected phase variants.

3. The RFID reader circuit of claim 1, wherein at least one of the selected phase variants is a differential signal.

4. The RFID reader circuit of claim 1, wherein the third RF signal is generated from a local oscillator of the transmit circuit.

5. The RFID reader circuit of claim 1, wherein the third RF signal is generated from a signal output by a power amplifier of the transmit circuit.

6. The RFID reader circuit of claim 1, wherein the amplitudes of at least one of the selected two phase variants is selected during a calibration process of the reader.

7. The RFID reader circuit of claim 6, wherein the calibration process is repeated upon one of: a change of an antenna, an addition of an antenna, a removal of an antenna, and a modification of the transmit circuit.

8. The RFID reader circuit of claim 6, wherein the calibration process is repeated during transmission of the first RF signal.

9. The RFID reader circuit of claim 1, wherein the self-jammer cancellation circuit includes a poly-phase filter.

10. The RFID reader circuit of claim 1, wherein the self-jammer cancellation circuit includes a poly-phase filter with at least two distinct rings.

11. A method for an Radio Frequency Identification (RFID) reader comprising:
transmitting a first radio frequency (RF) signal from a transmit circuit;
receiving a second RF signal at a receive circuit; and
at a self-jammer cancellation circuit:
receiving a third RF signal associated with the first RF signal,
receiving a self-jamming signal associated with the first RF signal,
generating at least two distinct phase variants of the third RF signal,
selecting two of the distinct phase variants, wherein a vector projection of a first of the selected phase variants on a second of the selected phase variants is substantially greater than zero, and wherein a canceling signal comprising a combination of the selected phase variants is substantially opposite in phase to the self-jamming signal,
selecting amplitudes for each of the two selected phase variants such that the canceling signal is substantially equal in amplitude to the self-jamming signal, and
combining the canceling signal with the second RF signal to reduce an amplitude of the second RF signal.

12. The method of claim 11, further comprising:
generating a first bias current proportional to the amplitude of the first of the selected phase variants and a second bias current proportional to the amplitude of the second of the selected phase variants at the self-jammer cancellation circuit.

13. The method of claim 11, wherein at least one of the selected phase variants is a differential signal.

14. The method of claim 11, further comprising:
generating the third RF signal from one of: a local oscillator of the transmit circuit and a signal output by a power amplifier of the transmit circuit.

15. The method of claim 11, further comprising:
selecting the amplitudes of at least one of the selected two phase variants during a calibration process of the reader.

16. The method of claim 15, further comprising:
repeating the calibration process upon one of: a change of an antenna, an addition of an antenna, a removal of an antenna, and a modification of the transmit circuit.

17. The method of claim 15, further comprising:
repeating the calibration process during transmission of the first RF signal.

18. The method of claim 11, wherein the self-jammer cancellation circuit includes a poly-phase filter with at least one ring.

19. A method for an interface converter operable to control a utility of a Radio Frequency Identification (RFID) reader circuit communicating with a plurality of RFID tags and capable of reducing a self-jammer signal, the method comprising:
receiving a high-down transmission to control the utility in a first manner for:
transmitting a first radio frequency (RF) signal from a transmit circuit;
receiving a second RF signal at a receive circuit; and
at a self-jammer cancellation circuit:
receiving a third RF signal associated with the first RF signal,
receiving a self-jamming signal associated with the first RF signal,
generating at least two distinct phase variants of the third RF signal,
selecting two of the distinct phase variants, wherein a vector projection of a first of the selected phase variants on a second of the selected phase variants is substantially greater than zero, and wherein a canceling signal comprising a combination of the selected phase variants is substantially opposite in phase to the self-jamming signal,
selecting amplitudes for each of the two selected phase variants such that the canceling signal is substantially equal in amplitude to the self-jamming signal, and
combining the canceling signal with the second RF signal to reduce an amplitude of the second RF signal.

20. The method of claim 19, wherein the utility is implemented as part of a device other than the RFID reader.

21. The method of claim 19, wherein the first manner includes one of: installing, enabling, configuring, operating, and disabling the utility.

* * * * *

UNITED STATES PATENT AND TRADEMARK OFFICE
CERTIFICATE OF CORRECTION

PATENT NO. : 8,260,241 B1  
APPLICATION NO. : 12/914916  
DATED : September 4, 2012  
INVENTOR(S) : John D. Hyde Page 1 of 1

It is certified that error appears in the above-identified patent and that said Letters Patent is hereby corrected as shown below:

In the drawings, Sheet 9 (Fig. 10), delete "AMPLIDUDES", line 2 and insert -- AMPLITUDES --, therefor, In the Specifications:

Column 11, line 51, delete "as and" and insert -- as an --, therefor, and

Column 12, line 26, delete "as and" and insert -- as an --, therefor.

Signed and Sealed this  
Sixteenth Day of April, 2013

Teresa Stanek Rea  
*Acting Director of the United States Patent and Trademark Office*